US012571890B2

(12) United States Patent    (10) Patent No.:    US 12,571,890 B2

Tanaka et al.    (45) Date of Patent:    Mar. 10, 2026

(54) OPTICAL SENSOR, ELECTRONIC DEVICE, DISTANCE CALCULATION METHOD, AND STORAGE MEDIUM OF PROGRAM

(71) Applicant: Sharp Semiconductor Innovation Corporation, Tenri (JP)

(72) Inventors: Mami Tanaka, Tenri (JP); Kouji Iwamori, Tenri (JP); Norikazu Okada, Tenri (JP)

(73) Assignee: Sharp Semiconductor Innovation Corporation, Tenri City (JP)

( * ) Notice: Subject to any disclaimer, the term of this patent is extended or adjusted under 35 U.S.C. 154(b) by 997 days.

(21) Appl. No.: 17/723,095

(22) Filed: Apr. 18, 2022

(65) Prior Publication Data

US 2022/0342052 A1    Oct. 27, 2022

(30) Foreign Application Priority Data

Apr. 21, 2021    (JP) ................................. 2021-072082

(51) Int. Cl.
G01S 7/4865    (2020.01)
G01S 7/4861    (2020.01)

(52) U.S. Cl.
CPC .......... G01S 7/4866 (2013.01); G01S 7/4861 (2013.01)

(58) Field of Classification Search
None
See application file for complete search history.

(56) References Cited

U.S. PATENT DOCUMENTS

| | | | |
|---|---|---|---|
| 2020/0191958 A1 | 6/2020 | Ikuta et al. | |
| 2022/0236423 A1* | 7/2022 | Sasaya | G01S 17/10 |
| 2022/0260691 A1* | 8/2022 | Hirano | G01S 17/10 |
| 2022/0283305 A1* | 9/2022 | Tachwali | G01S 17/93 |
| 2022/0373658 A1* | 11/2022 | Wilton | G01S 7/4816 |
| 2023/0324525 A1* | 10/2023 | Hirano | H03L 7/099 |
| | | | 356/5.01 |
| 2023/0408254 A1 | 12/2023 | Ohki | |

FOREIGN PATENT DOCUMENTS

| | | |
|---|---|---|
| JP | 2018091760 A | 6/2018 |
| JP | 6709335 B2 | 6/2020 |
| JP | 2021001756 A | 1/2021 |
| WO | 2022085310 A1 | 4/2022 |

* cited by examiner

*Primary Examiner* — Eric L Bolda
(74) *Attorney, Agent, or Firm* — ScienBiziP, P.C.

(57)    ABSTRACT

An optical sensor comprises a light-emitting element configured to emit light in a region where an object is present; a light-receiving element configured to receive reflected light from the object; a generation unit configured to generate a histogram indicating a relationship between a time from emission of the light by the light-emitting element to reception of the reflected light by the light-receiving element and an intensity of the reflected light received by the light-receiving element; a first calculation unit configured to calculate skewness of the histogram; and a second calculation unit configured to calculate a distance between the optical sensor and the object with reference to the histogram and the skewness.

8 Claims, 11 Drawing Sheets

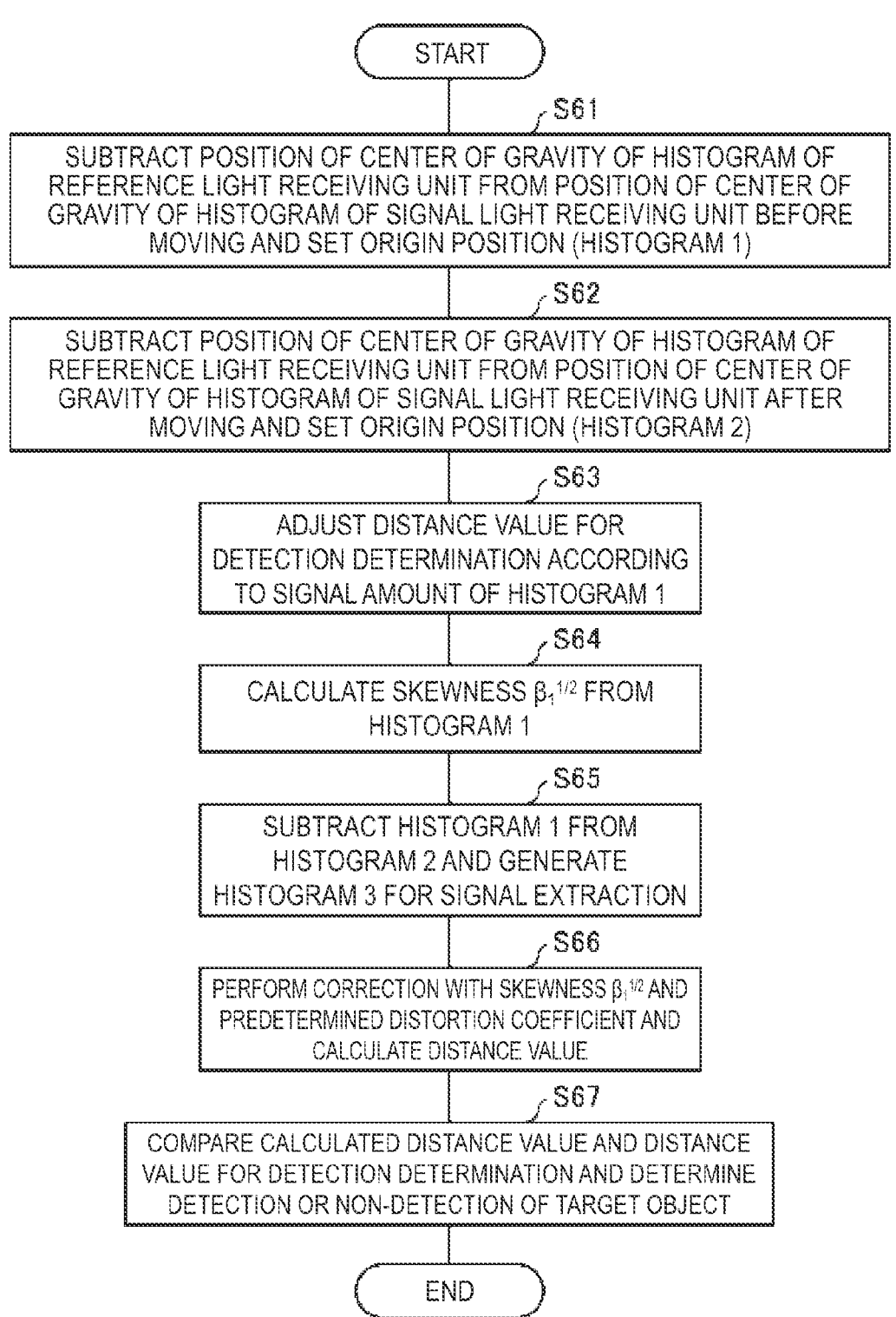

START

S61

SUBTRACT POSITION OF CENTER OF GRAVITY OF HISTOGRAM OF REFERENCE LIGHT RECEIVING UNIT FROM POSITION OF CENTER OF GRAVITY OF HISTOGRAM OF SIGNAL LIGHT RECEIVING UNIT BEFORE MOVING AND SET ORIGIN POSITION (HISTOGRAM 1)

S62

SUBTRACT POSITION OF CENTER OF GRAVITY OF HISTOGRAM OF REFERENCE LIGHT RECEIVING UNIT FROM POSITION OF CENTER OF GRAVITY OF HISTOGRAM OF SIGNAL LIGHT RECEIVING UNIT AFTER MOVING AND SET ORIGIN POSITION (HISTOGRAM 2)

S63

ADJUST DISTANCE VALUE FOR DETECTION DETERMINATION ACCORDING TO SIGNAL AMOUNT OF HISTOGRAM 1

S64

CALCULATE SKEWNESS $\beta_1{}^{1/2}$ FROM HISTOGRAM 1

S65

SUBTRACT HISTOGRAM 1 FROM HISTOGRAM 2 AND GENERATE HISTOGRAM 3 FOR SIGNAL EXTRACTION

S66

PERFORM CORRECTION WITH SKEWNESS $\beta_1{}^{1/2}$ AND PREDETERMINED DISTORTION COEFFICIENT AND CALCULATE DISTANCE VALUE

S67

COMPARE CALCULATED DISTANCE VALUE AND DISTANCE VALUE FOR DETECTION DETERMINATION AND DETERMINE DETECTION OR NON-DETECTION OF TARGET OBJECT

END

FIG. 11

OPTICAL SENSOR, ELECTRONIC DEVICE, DISTANCE CALCULATION METHOD, AND STORAGE MEDIUM OF PROGRAM

CROSS-REFERENCE TO RELATED APPLICATION

The present application claims priority from Japanese Application JP2021-072082, the content of which is hereby incorporated by reference into this application.

BACKGROUND

1. Field

An aspect of the present disclosure relates to an optical sensor, an electronic device, a distance calculation method, and a storage medium of a program.

In distance calculation of a target object by a time of flight (ToF) sensor, as an example, reflected light is counted by a time to digital converter (TDC) circuit for each time period from emission of light to reception of the reflected light from a target object (time of flight of light), and the TDC circuit generates a histogram. Then, the distance from the sensor to the target object is calculated using a time, at which the count is a maximum value, among the time of flight of light.

For example, JP 6709335 B discloses a method of using a sensor cover to subtract a crosstalk component or a disturbance light component other than a reflected light component of the target object. Specifically, in order to improve measurement time, which accompanies improvement of the resolution of a camera, the distance from the sensor to the target object is determined by calculating reflected light in which a pulsed light emitted from a light-emitting element is reflected by the target object and is incident on a first light receiving unit and reference light in which the pulsed light emitted from the light-emitting element is directly incident on a second light receiving unit (crosstalk inside the sensor). In this way, by subtracting the reference light component from the reflected light component, accuracy of the reflected light component is improved.

SUMMARY

However, in the known art, there is a problem in that in a case where reflected light components from a plurality of target objects are mixed in a histogram, distance calculation accuracy of one target object cannot be improved. This is because, even when the reflected light and the reference light is calculated, in a case where an object other than the target object (hereinafter referred to as a "non-target object") is present around the target object, the reflected light from the non-target object mixes with the reflected light from the target object, and thus the distance to the target object cannot be accurately calculated.

An aspect of the present disclosure is to calculate distance to a target object with high accuracy even when a non-target object is present around the target object.

In order to solve the problem described above, an optical sensor according to an aspect of the present disclosure includes a light-emitting element configured to emit light in a region where an object is present, a light-receiving element configured to receive reflected light from the object, a generation unit configured to generate a histogram indicating a relationship between a time from emission of the light by the light-emitting element to reception of the reflected light by the light-receiving element and an intensity of the reflected light received by the light-receiving element, a first calculation unit configured to calculate skewness of the histogram, and a second calculation unit configured to calculate a distance between the optical sensor and the object with reference to the histogram and the skewness.

Furthermore, a distance calculation method according to an aspect of the present disclosure is the distance calculation method for an optical sensor for measuring a distance to an object, the optical sensor including a light-emitting element configured to emit light in a region where the object is present and a light-receiving element configured to receive a reflected light from the object, wherein the distance calculation method includes generating a histogram indicating a relationship between a time from emission of the light by the light-emitting element to reception of the reflected light by the light-receiving element and an intensity of the reflected light received by the light-receiving element, performing a first calculation of calculating skewness indicating a degree of distortion from a normal distribution of the histogram generated in the generating of the histogram, and performing a second calculation of correcting the histogram generated in the generating of the histogram by using the skewness calculated in the first calculation and calculating a distance between the optical sensor and the object from the histogram.

According to an aspect of the present disclosure, distance to a target object can be calculated with high accuracy.

BRIEF DESCRIPTION OF THE DRAWINGS

FIG. 11 is a flowchart illustrating processing of the optical sensor according to the sixth embodiment of the present disclosure.

DESCRIPTION OF EMBODIMENTS

First Embodiment

A first embodiment of the present disclosure will be described in detail below.

Configuration of Optical Sensor 1

Figure 1:
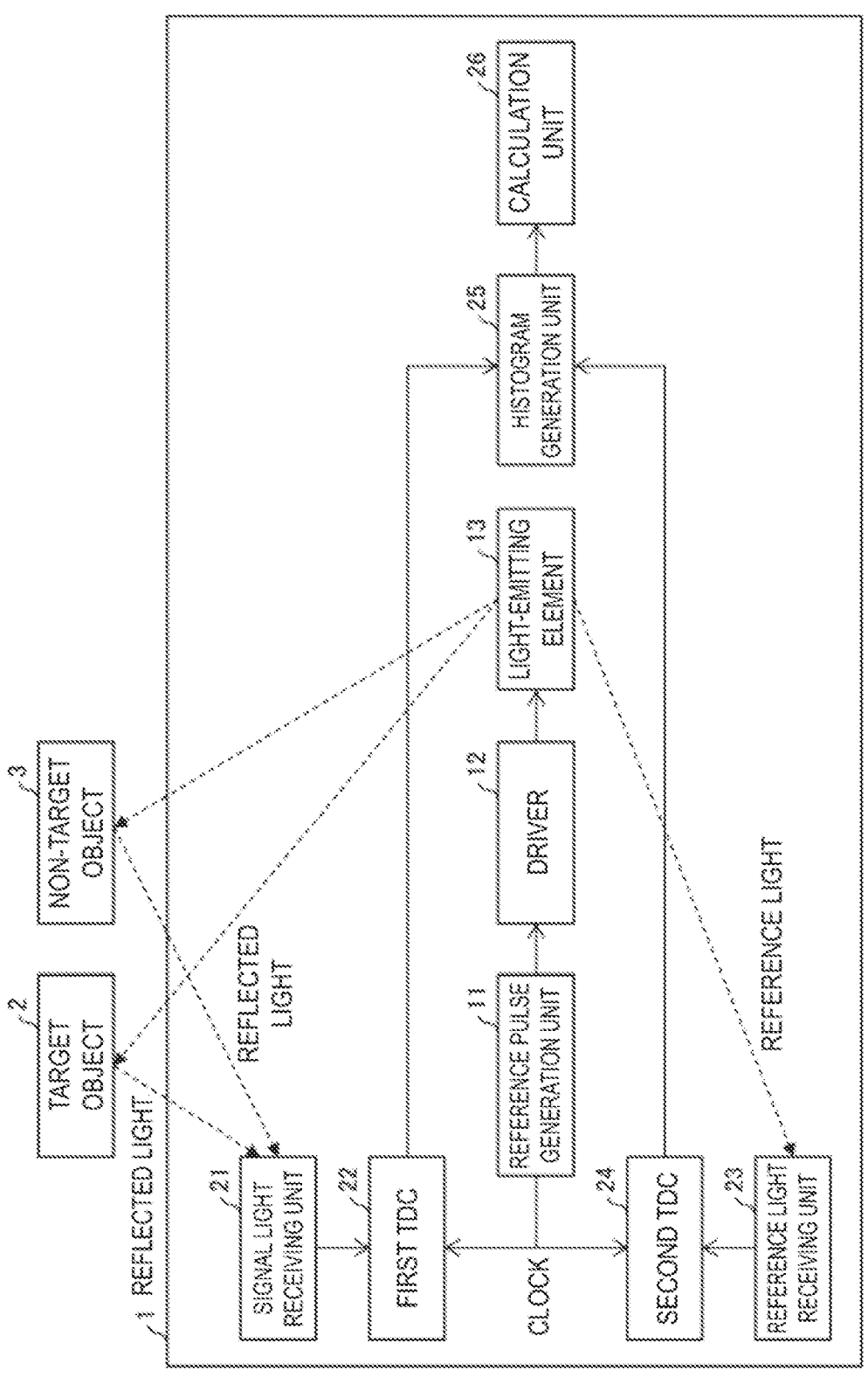
FIG. 1 is a block diagram illustrating a configuration of an optical sensor according to a first embodiment of the present disclosure.

FIG. 1 is a block diagram illustrating a configuration of an optical sensor 1 according to the present embodiment. The optical sensor 1 is a ToF sensor configured to measure distance to an object based on a time from emission of light to reception of reflected light from the object.

As illustrated in FIG. 1, the optical sensor 1 includes a reference pulse generation unit 11, a driver 12, a light-emitting element 13, a signal light receiving unit (light-receiving element) 21, a first TDC 22, a reference light receiving unit (light-receiving element) 23, a second TDC 24, a histogram generation unit (generation unit) 25, and a calculation unit (first calculation unit and second calculation unit) 26.

The reference pulse generation unit 11 supplies a reference pulse having a wave shape to the driver 12. The reference pulse generation unit 11 supplies a reference clock signal to the first TDC 22 and the second TDC 24.

The driver 12 causes the light-emitting element 13 to emit a pulsed light based on the reference pulse from the reference pulse generation unit 11. The light-emitting element 13 emits light in a region where a target object (object) 2 is present. The pulsed light emitted from the light-emitting element 13 is reflected by each of the target object 2 and a non-target object 3 and is incident on the signal light receiving unit 21. The pulsed light emitted from the light-emitting element 13 is directly incident on the reference light receiving unit 23. Hereinafter, light that is directly incident on the reference light receiving unit 23 is referred to as "reference light".

The signal light receiving unit 21 is a light-receiving element for receiving reflected light from the target object 2 and the non-target object 3, and outputs a pulse that is synchronized with respect to the reflected light from the target object 2 and the non-target object 3 to the first TDC 22. The first TDC 22 outputs a time stamp indicating a pulse output time of the pulse output by the signal light receiving unit 21 to the histogram generation unit 25.

The reference light receiving unit 23 outputs a pulse that is synchronized with respect to the reference light from the light-emitting element 13 to the second TDC 24. The second TDC 24 outputs a time stamp indicating a pulse output time of the pulse output by the reference light receiving unit 23 to the histogram generation unit 25.

The histogram generation unit 25 generates a histogram indicating a relationship between a time from emission of the light by the light-emitting element 13 to reception of the reflected light by the signal light receiving unit 21 and an intensity of the reflected light received by the signal light receiving unit 21. Specifically, the histogram generation unit 25 receives the time stamp from the first TDC 22 and increases a count value in a bin serving as a measurement interval corresponding to the time stamp. Then, the histogram generation unit 25 counts the time stamp in a predetermined cycle and generates a histogram based on the count. The histogram generation unit 25 receives the time stamp also from the second TDC 24 and performs processing similar to that described above to generate a histogram. Note that the intensity of the reflected light is proportional to the count value in the bin.

Among the histograms generated by the histogram generation unit 25, a position of the center of gravity of the histogram based on the time stamp from the second TDC 24 is set as a origin with respect to the histogram based on the time stamp from the first TDC 22, and the calculation unit 26 calculates a detection distance from a difference between the position of the center of gravity of the former histogram and the position of the center of gravity of the latter histogram.

Subsequently, the calculation unit (first calculation unit) 26 calculates skewness indicating a degree of distortion from a normal distribution of the above-described histogram which is set as the origin. Then, the calculation unit (second calculation unit) 26 calculates a distance between the optical sensor 1 and the target object 2 with reference to the histograms generated by the histogram generation unit 25 and the calculated skewness.

Note that the optical sensor 1 may output data of the calculated distance to another device located a short distance away (for example, a memory on the same substrate) by inter-integrated circuit (I2C) communication.

Figure 2:
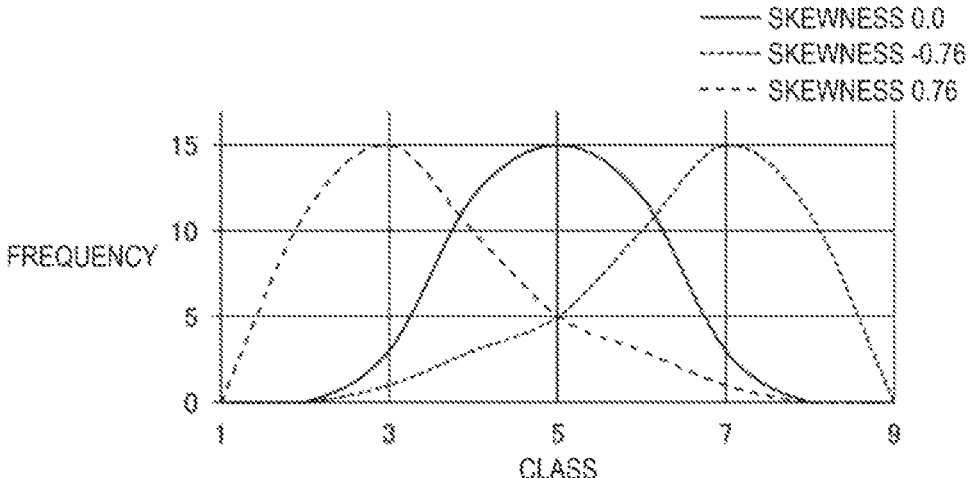
FIG. 2 is a graph showing examples of histograms according to the first embodiment of the present disclosure.

FIG. 2 is a graph showing examples of histograms according to the present embodiment. Since the optical sensor 1 has the above-described distance detection mechanism, in a case where the non-target object 3, which is an object other than the target object 2, is also present within the sensing range of the histogram, the reflected light components from the target object 2 and the non-target object 3 are combined in the signal obtained by the signal light receiving unit 21 of the optical sensor 1, as illustrated in FIG. 2. Thus, a histogram indicating the result of counting the signals for each bin has a distorted shape.

In other words, in FIG. 2, because the position of the center of gravity of the histogram shifts, the class in which the frequency peaks also shifts. In this histogram, since the time from the emission of light to the reception of the reflected light, which corresponds to the class, cannot be accurately specified, highly accurate distance calculation cannot be performed.

In the present embodiment, in order to correspond to the shift of the position of the center of gravity, a degree of distortion of the histogram in which a plurality of objects obtained by the optical sensor 1 are mixed is determined to be skewness, and correction according to the skewness is applied at the time of distance calculation to improve the accuracy of the distance calculation.

Description of Skewness

The "skewness" is a value indicating how far a distribution map (histogram) is distorted from a normal distribution as a statistical method. As illustrated in FIG. 2, the skewness is a positive value (for example, 0.76) in a histogram that leans forward with a tail further backward. Furthermore, the skewness is a negative value (for example, −0.76) in a histogram that leans backward with a tail further forward. The skewness is an index in which the absolute value of the index becomes larger as each tendency becomes stronger.

A degree of collapse of the histogram shape is quantified with a skewness $\beta_1^{1/2}$, and the distance value to the object is corrected using the $\beta_1^{1/2}$ to detect the target object. $\beta_1^{1/2}$ is calculated by Equation (1). In this equation, b is a section number of the histogram bin interval (measurement interval). $n_b$ is a signal amount in each bin (a count value of the time stamp per unit time that is shorter than the measurement interval). $\mu$ is an average value of the section number b. In other words, $\mu$ is a section number in which a frequency of occurrence of the signal is greatest. σ is a positive square root of a dispersion of the section number b (in other words, standard deviation).

[Equation 1]

$$\beta_1^{1/2} = \frac{\sum_b n_b(b-\mu)^3}{\sum_b n_b \sigma^3} \qquad \text{Equation (1)}$$

By correcting the distance value in a direction of the target object 2 by using the skewness $\beta_1^{1/2}$, distance calculation with further high accuracy can be performed. Furthermore, a threshold value related to determination in object detection is determined by using the skewness $\beta_1^{1/2}$, and thus object detection that is less likely to be influenced by the non-target object can be performed.

Processing of Optical Sensor 1

Figure 3:
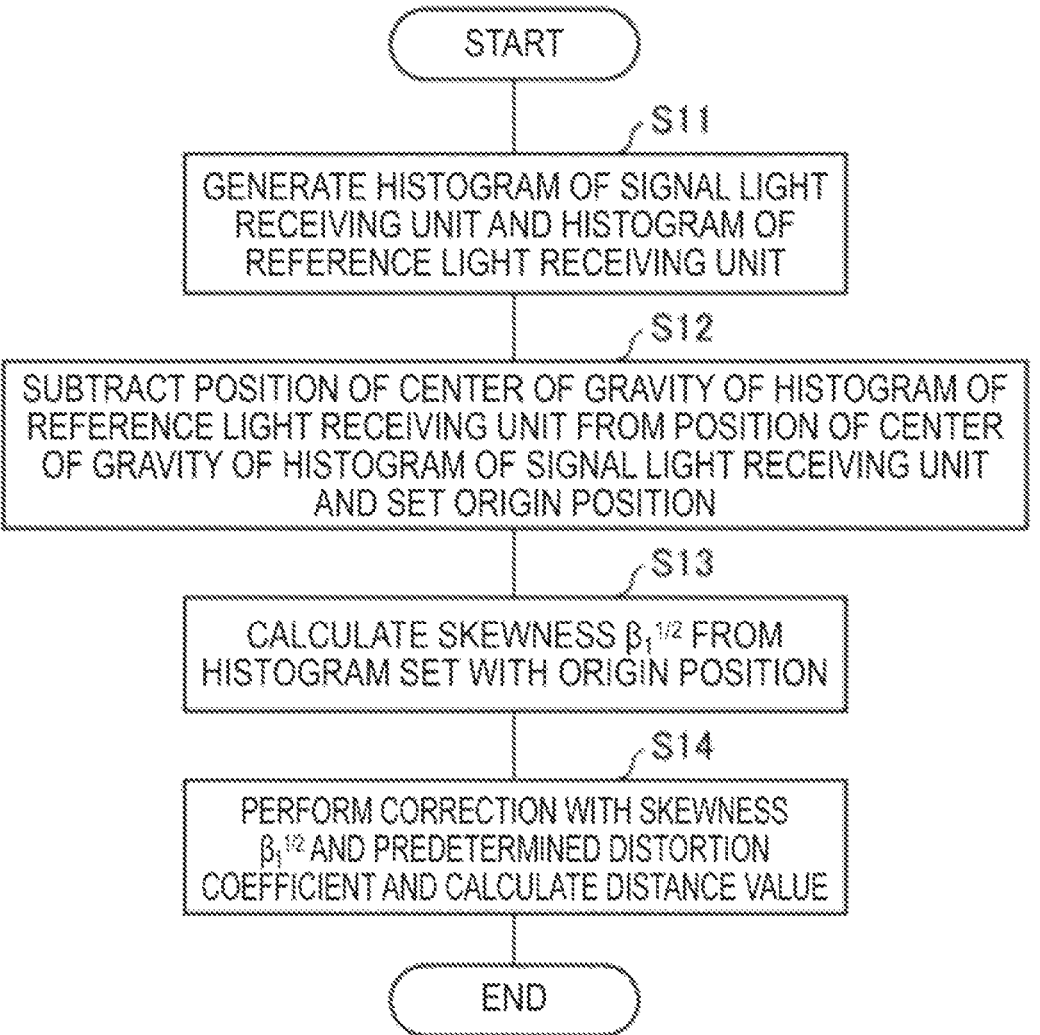
FIG. 3 is a flowchart illustrating processing of the optical sensor according to the first embodiment of the present disclosure.

FIG. 3 is a flowchart illustrating processing of the optical sensor 1 according to the present embodiment. The processing of the optical sensor 1 will be described in accordance with FIG. 3.

Step S11: Generation Step

In the optical sensor 1, the histogram generation unit 25 generates a histogram based on a signal from the signal light receiving unit 21 configured to receive signal light outside the optical sensor 1. Furthermore, the histogram generation unit 25 generates a histogram based on a signal from the reference light receiving unit 23 configured to receive reference light inside the optical sensor 1.

Step S12

The calculation unit 26 subtracts a position of the center of gravity of the histogram based on the reference light from a position of the center of gravity of the histogram based on the signal light, generated in step S11. Thus, an origin position can be set in the histogram. In the present embodiment, this histogram is used in steps S13 and S14.

Step S13: First Calculation Step

The calculation unit 26 calculates skewness by using Equation (1) from the histogram of the result in which the origin position is set in step S12.

Step S14: Second Calculation Step

The calculation unit 26 calculates the distance between the optical sensor 1 and the target object 2 with reference to the histogram of the result in which the origin position is set in step S12, the skewness calculated in step S13, and a predetermined distortion coefficient. Specifically, the calculation unit 26 calculates the distance from the histogram and corrects the distance by using the skewness and the distortion coefficient. For example, as in Equation (2), the calculation unit 26 calculates a distance value Range obtained by multiplying a position of the center of gravity $G_{hist}$ of the histogram by a histogram width W, and corrects the distance value Range with a value obtained by multiplying the skewness $\beta_1^{1/2}$ by a distortion coefficient K.

[Equation 2]

$$\text{Range}=G_{hist} \times W + \beta_1^{1/2} \times K \qquad \text{Equation (2)}$$

The distortion coefficient K may be, for example, an experimentally determined numerical value, or may be appropriately set according to a measurement range or the like of the optical sensor 1.

As described above, the optical sensor 1 can calculate the distance to the target object 2 with high accuracy.

As described above, a case has been described in which the reference light is used as the origin information, but the present embodiment is not limited this example. For example, as a modification, components (for example, the reference light receiving unit 23 and the second TDC 24) and steps (for example, generation of a histogram based on the reference light (the second half of step S11), setting of the origin (step S12), and the like) associated with the reference light from the light-emitting element 13 may be omitted, and a histogram based on the signal light generated in the first half of step S11 may be used in steps S13 and S14.

Example 1

Figure 4:
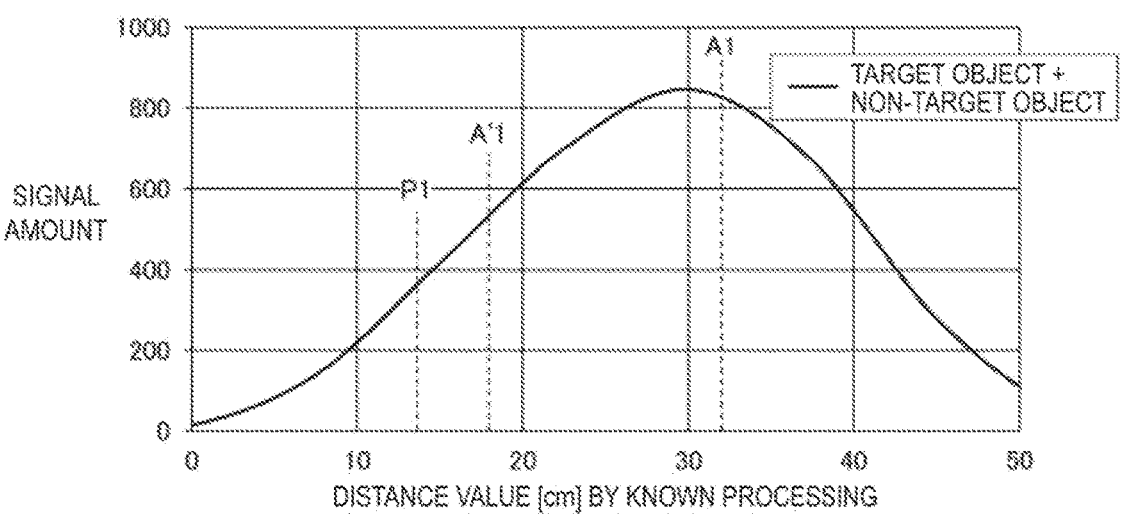
FIG. 4 is a graph showing a specific example according to the first embodiment of the present disclosure.

FIG. 4 is a graph showing a specific example according to the present embodiment. In the example illustrated in FIG. 4, the target object 2 is transparent and is mounted on the non-target object 3 serving as a floor.

In the example illustrated in FIG. 4, the optical sensor 1 according to the present embodiment determines distortion of a histogram in which the reflected light of the target object 2 and the reflected light of the non-target object 3 are mixed, and corrects the distance value Range to the target object 2 by using Equation (3).

[Equation 3]

$$\text{Range}=G_{hist} \times 7.5 + \beta_1^{1/2} \times 13.9 \qquad \text{Equation (3)}$$

In this equation, $G_{hist}$ is a position of the center of gravity of the histogram. 7.5 is a histogram width. 13.9 is a distortion coefficient.

Note that distance calculation by a known method is illustrated in Equation (4).

[Equation 4]

$$\text{Range}=G_{hist} \times 7.5 \qquad \text{Equation (4)}$$

The calculation unit 26 (second calculation unit) of the optical sensor 1 calculates the distance between the optical sensor 1 and the target object 2 by using the center of gravity of the histogram and a value obtained by multiplying the skewness by the distortion coefficient. Specifically, as in the Equation (3), the calculation unit 26 adds a product obtained by multiplying the skewness by the distortion coefficient to a distance Range in Equation (4).

The skewness $\beta_1^{1/2}$ in the mixed state in FIG. 4 is −1.06, and not only the signal of the target object 2 but also the signal of the non-target object 3 are mixed. Thus, it can be determined that the histogram is dominated by the signal of the non-target object 3 with the tail further forward.

A calculated distance value obtained by correcting the position of the center of gravity by an amount of the tail according to Equation (3) is a position indicated by A'1, and thus it is possible to calculate a distance closer to a theoretical distance value P1 between the optical sensor 1 and the target object 2 than a position of a calculated distance value A1 in the mixed state before correction by the Equation (4) even in a case of the transparent target object 2 which is strongly influenced by the reflection in the target object 2 and the reflection by the non-target object 3 and is intrinsically difficult to detect the distance.

Second Embodiment

A second embodiment of the present disclosure will be described below. Note that, for convenience of explanation, components having functions identical to those in the first embodiment will be denoted by the same reference numerals, and descriptions of those components will be omitted.

In a case where the target object 2 is detected by the optical sensor 1, when the optical sensor 1 is close to the target object 2, there is a tendency that a signal amount from the target object 2 greatly changes, while a signal amount from the non-target object 3 does not change much in relation to the light received in the optical sensor 1. In the present embodiment, the histogram generation unit 25 generates a first histogram corresponding to the target object 2 and the non-target object 3 before the optical sensor 1 moves, and a second histogram corresponding to the target object 2 and the non-target object 3 after the optical sensor 1 moves. The calculation unit (second calculation unit) 26 calculates the distance between the optical sensor 1 and the target object 2 with reference to a difference between the first histogram and the second histogram. Since the signal component of the target object 2 remains in the difference, the distance can be calculated with high accuracy.

Figure 5:
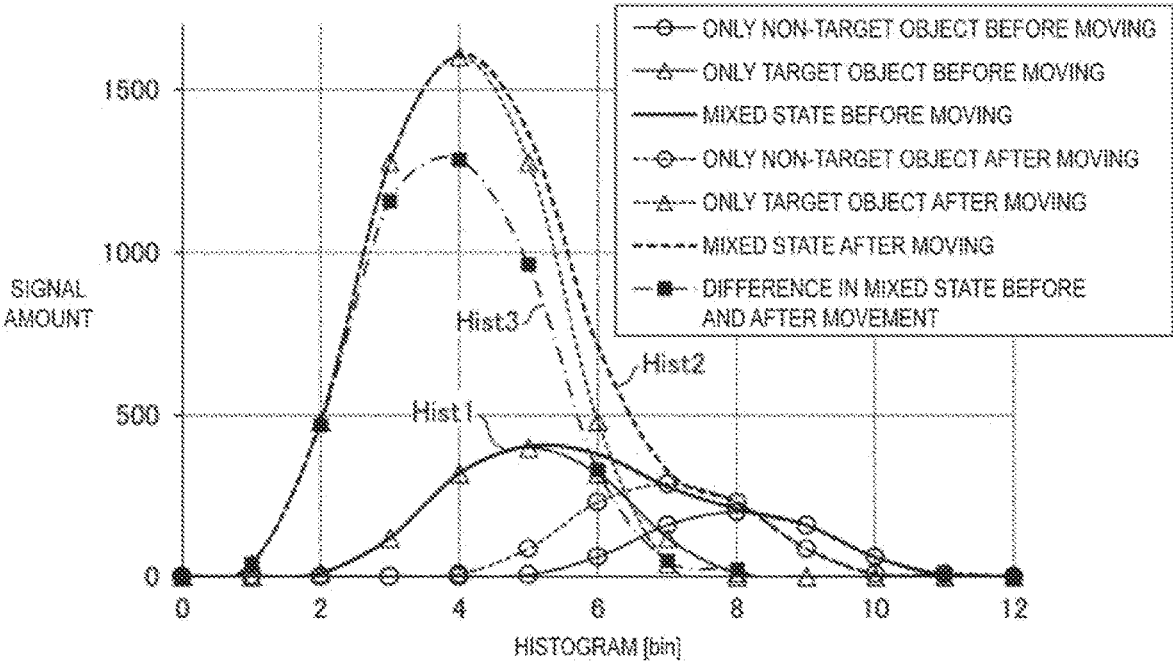
FIG. 5 is a graph showing histograms of distances between an optical sensor and a target object and between the optical sensor and a non-target object according to a second embodiment of the present disclosure.

FIG. 5 is a graph showing histograms of distances between the optical sensor 1 and the target object 2 and between the optical sensor 1 and the non-target object 3 according to the present embodiment, where the horizontal axis represents a section number of a bin interval (measurement interval), and the vertical axis represents the signal amount received from the target object and/or the non-target object. As shown in FIG. 5, a histogram 1 (Hist 1) is a histogram in a state where the target object and the non-target object are mixed before moving and is indicated by a solid line to which plot marks are not added. A histogram 2 (Hist 2) is a histogram in a state where the target object and the non-target object are mixed after moving and is indicated by a dotted line to which plot marks are not added. A histogram 3 (Hist 3) is a histogram generated by subtracting the histogram 1 from the histogram 2 and is indicated by a dashed-dotted line to which square plot marks are added.

In FIG. 5, when the histogram 1 and the histogram 2 are compared, the histogram 2 when the distance between the optical sensor 1 and the target object 2 is shorter due to the movement of the optical sensor 1 or the target object 2 has a larger signal amount of the target object 2 than that of the histogram 1 when the distance is longer before moving. As shown in the lines with triangles in FIG. 5, it can be seen that there is a large difference in the signal amount received from the target object 2 by the optical sensor 1 before and after the movement. This is because the intensity of the light is inversely proportional to the square of the distance from the light source, and thus the shorter the distance, the larger the signal amount indicating the intensity of the light. On the other hand, as shown in the lines with circles in FIG. 5, the signal amount received from the non-target object 3 by the optical sensor 1 does not change much before and after the movement. In addition, since the signal amount is different for each of the target object 2, the non-target object 3, and the mixed state of the target object 2 and the non-target object 3, the histogram in the mixed state tends to have a distorted shape, as shown in FIG. 5.

Thus, the histogram 3 is generated by subtracting the histogram 1 from the histogram 2 shown in FIG. 5. As a result, the distance between the optical sensor 1 and the target object 2 can be calculated with high accuracy.

When the optical sensor 1 is close to the target object 2, the signal amount of the target object 2 close to the optical sensor 1 increases greatly before and after the optical sensor 1 moves as shown by the lines with the triangles in FIG. 5, but the signal amount of the non-target object 3 that is separated from the optical sensor 1 does not change much as shown the lines with the circles in FIG. 5.

Accordingly, due to the subtraction described above, a signal component of the non-target object 3 is substantially canceled and a small signal amount is subtracted from a large signal amount in the signal component of the target object 2, and thus a large amount of the signal component of the target object 2 remains. As a result, the distance can be calculated with high accuracy. Note that, the calculation unit 26 need not necessarily always subtract the histogram before moving from the histogram after moving, and may subtract a histogram having a smaller signal amount from a histogram having a larger signal amount among the histogram before moving and the histogram after moving.

Figure 6:
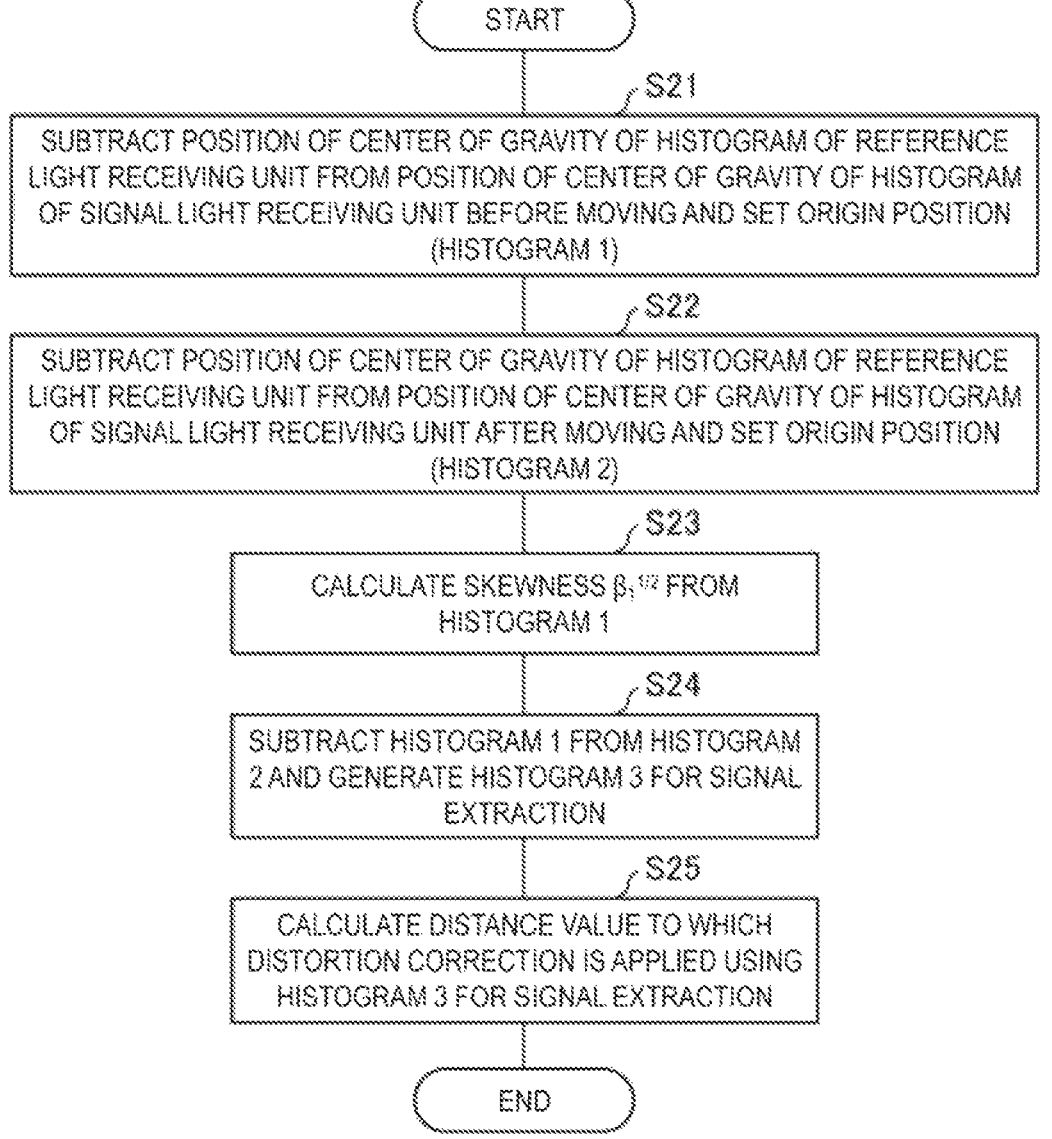
FIG. 6 is a flowchart illustrating processing of the optical sensor according to the second embodiment of the present disclosure.

Processing of Optical Sensor 1 FIG. 6 is a flowchart illustrating processing of the optical sensor 1 according to the present embodiment. The processing of the optical sensor 1 will be described in accordance with FIG. 6.
Step S21

Before the target object 2 moves, in the optical sensor 1, the histogram generation unit 25 generates a histogram based on a signal from the signal light receiving unit 21 configured to receive a signal light outside the optical sensor 1. Furthermore, the histogram generation unit 25 generates a histogram based on a signal from the reference light receiving unit 23 configured to receive reference light inside the optical sensor 1. Then, the calculation unit 26 subtracts a position of the center of gravity of the histogram based on the reference light from a position of the center of gravity of the generated histogram based on the signal light. As a result, in the histogram 1 before moving (Hist1: solid line in the mixed state before moving in FIG. 5), the origin position can be set.
Step S22

After the target object 2 moves, in the optical sensor 1, the histogram generation unit 25 generates a histogram based on the signal from the signal light receiving unit 21 configured to receive the signal light outside the optical sensor 1. Furthermore, the histogram generation unit 25 generates the histogram based on the signal from the reference light receiving unit 23 configured to receive reference light inside the optical sensor 1. Then, the calculation unit 26 subtracts the position of the center of gravity of the histogram based on the reference light from the position of the center of gravity of the generated histogram based on the signal light. As a result, in the histogram 2 after moving (Hist2: broken line in the mixed state after moving in FIG. 5), the origin position can be set.
Step S23

The calculation unit 26 calculates the skewness from the histogram 1 obtained in step S21 by using Equation (1) of the first embodiment.
Step S24

The calculation unit 26 subtracts the histogram 1 obtained in step S21 from the histogram 2 obtained in step S22, and generates the histogram 3 for signal extraction (Hist 3: a dashed-dotted line of the signal difference of the target detection object in FIG. 5).

In this case, in a case where the non-target object 3 is present behind the target object 2, the position of the non-target object 3 is considered to be substantially constant and the signal amount is also substantially constant as shown in the lines representing the non-target object before and after the movement in FIG. 5. Furthermore, the signal amount representing the intensity of the light is inversely proportional to the square of the distance. Accordingly, by subtracting the histogram 1 before moving in the mixed state from the histogram 2 after moving in the mixed state, the histogram 3 for signal extraction schematically serving as a histogram after moving of only the target object 2 is generated.

Step S25

The calculation unit 26 calculates the distance value between the optical sensor 1 and the target object 2 from the histogram 3 for signal extraction generated in step S24, and corrects the distance value by using the skewness calculated in step S23 and a predetermined distortion coefficient.

Example 2

Figure 7:
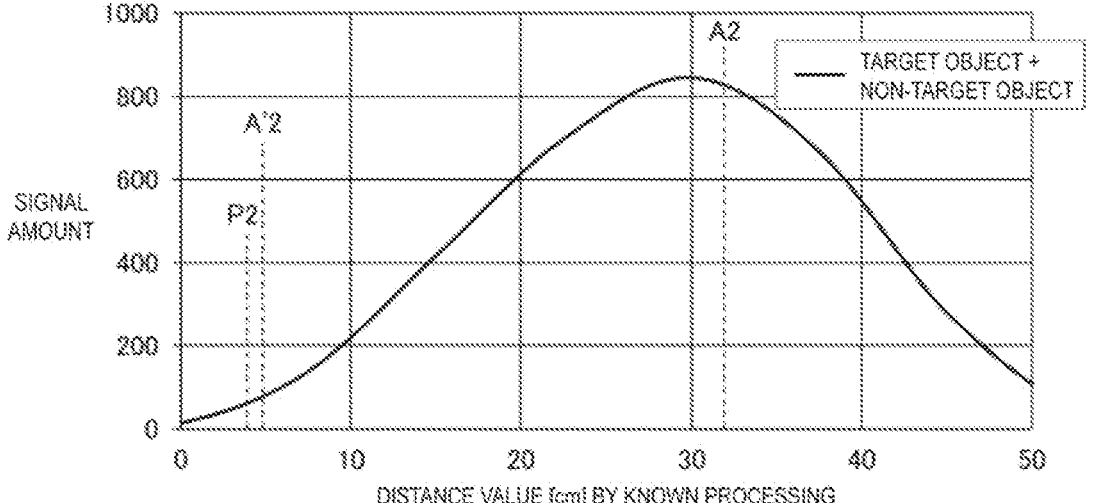
FIG. 7 is a graph showing a specific example of the second embodiment of the present disclosure.

FIG. 7 is a graph showing a specific example according to the present embodiment. As the specific example of the present embodiment, a case will be described in which the signals before and after movement are subtracted in the histogram in which the target object 2 and the non-target object 3 are mixed.

As illustrated in FIG. 7, as compared with before the subtraction, after the subtraction, the histogram having a shape closer to the histogram of only the target object 2 is obtained by excluding the tail component, and thus the target object component is dominant.

The center of gravity is at a position of 7.3 bin when calculated based on a typical histogram, but the center of gravity is at a position of 5.7 bin when calculated based on the histogram after the subtraction, which is a value close to the ideal value 3.7 bin in the present example.

A distance indicated by A2 is obtained when the calculation is performed by a known method based on the typical histogram. In comparison with Example 1 in which correction is applied using the skewness and the distance indicated by A'1 in FIG. 4 is obtained, the distance indicated by A'2 shown in FIG. 7 is obtained by calculating the Equations (1) and (2) based on the histogram after the difference, which is effective in improving accuracy (see FIG. 7).

In the equation, b is a section number of a bin interval (measurement interval) of the histogram, and $n_b$ is the signal amount in 1 bin. $\mu$ is an average value in the section b. $\sigma$ is a positive square root of a dispersion in the section b. $G_{hist}$ is a position of the center of gravity of the histogram. 7.5 is a histogram width. 13.9 is a distortion coefficient.

Third Embodiment

A third embodiment of the present disclosure will be described below. Note that, for convenience of explanation, components having functions identical to those in the first and second embodiments will be denoted by the same reference numerals, and descriptions of those components will be omitted.

Figure 8:
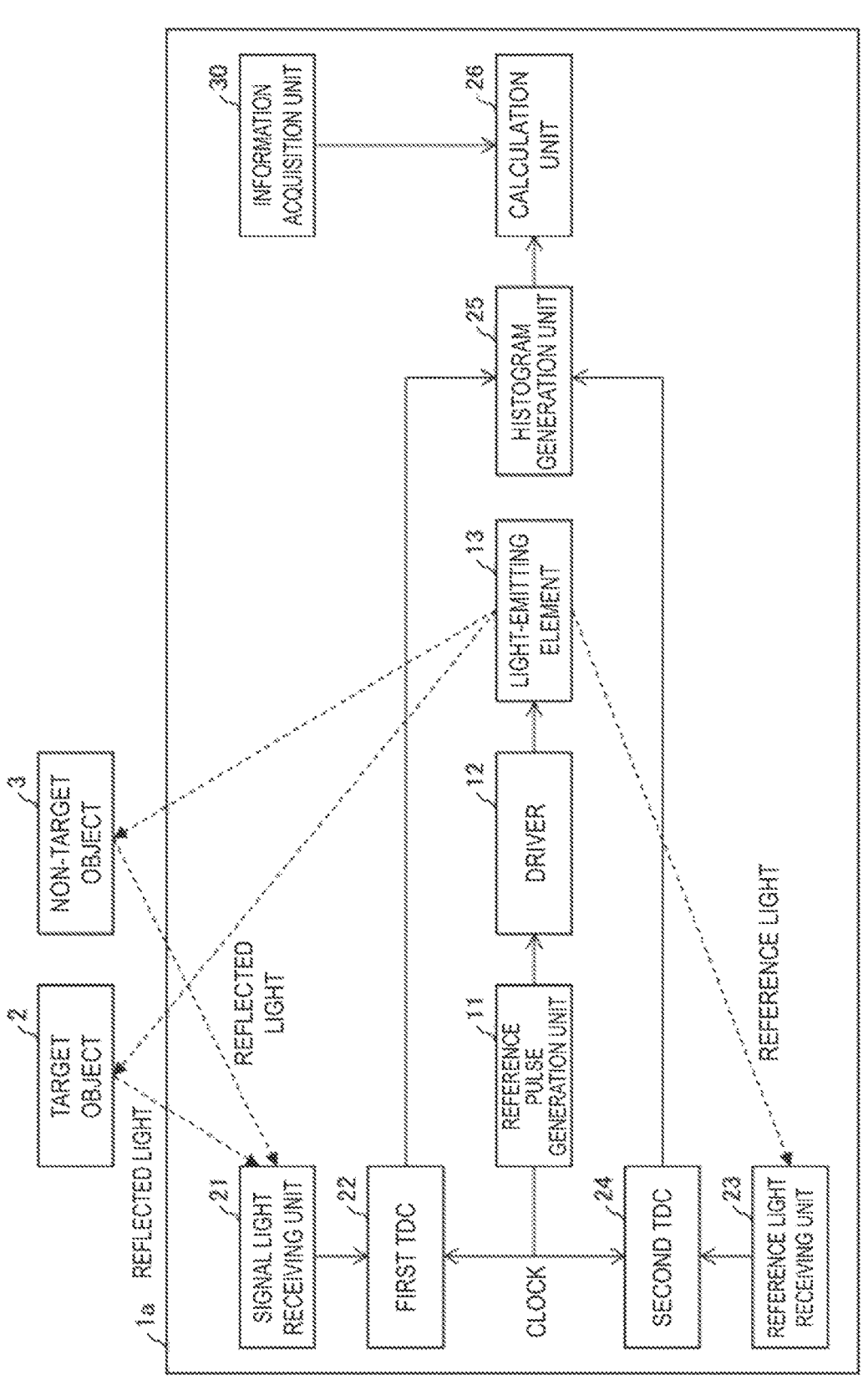
FIG. 8 is a block diagram illustrating a configuration of an optical sensor according to a third embodiment of the present disclosure.

FIG. 8 is a block diagram illustrating a configuration of an optical sensor 1a according to the present embodiment. The optical sensor 1a further includes an information acquisition unit (acquisition unit) 30 configured to acquire range-related information related to a range in which the target object (object) 2 may be present, and the calculation unit 26 calculates the skewness with reference to the range-related information. Specifically, the calculation unit 26 sets an element range (the range of $\Sigma$ in Equation (1) described above) of the histogram used for calculating the skewness to correspond to the range in which the target object 2 may be present. As a result, accuracy of the distance to be calculated is improved.

In one aspect, the information acquisition unit 30 may be configured to receive input of the range-related information from a user or another device. Examples of the range-related information include an assumed initial positional relationship between the optical sensor 1a and the target object 2, a moving distance of the optical sensor 1a or the target object

2, and a measurement range required for the optical sensor 1a. Note that the measurement range is a range that is arbitrarily determined according to the application of the optical sensor 1a, and is a range overlapping a detection range that is defined by performance of the optical sensor 1a.

In one aspect, the information acquisition unit 30 may detect the position of the non-target object 3 such that the position of the target object 2 is defined, and may acquire the range-related information based on the position of the non-target object 3. For example, in a case where the target object 2 is disposed on the non-target object 3, or the target object 2 is disposed in the non-target object 3, the information acquisition unit 30 can acquire the range-related information related to the range in which the target object 2 may be present based on the position of the non-target object 3. For example, during calibration of the optical sensor 1a, the optical sensor 1a may measure distance to the non-target object 3 instead of the target object 2, and the information acquisition unit 30 may acquire the range-related information based on the result.

According to the configuration described above, the calculation unit 26 sets the element range (the range of E in Equation (1) described above) of the histogram used for calculating the skewness to correspond to the range in which the target object 2 may be present, and thus the influence of reflected light from the non-target object 3 present outside the range where the target object 2 may be present can be eliminated as much as possible when the skewness is calculated. As a result, accuracy of the distance to be calculated is improved.

Fourth Embodiment

A fourth embodiment of the present disclosure will be described below. Note that, for convenience of explanation, components having functions identical to those in the first to third embodiments will be denoted by the same reference numerals, and descriptions of those components will be omitted.

In the present embodiment, similar to the third embodiment, the optical sensor 1a further includes the information acquisition unit (acquisition unit) 30 configured to acquire the range-related information related to the range in which the target object (object) 2 may be present. The calculation unit 26 of the optical sensor 1a calculates distance by using the distortion coefficient corresponding to the information related to the range in which the target object 2 may be present. As a result, accuracy of the distance to be calculated is improved.

The optical sensor 1a typically has a detection range having a central axis extending from the optical sensor 1a. The detection range may be represented as a substantially conical shape, or may be represented as a substantially three dimensional shape due to the shape of a window provided on the optical sensor 1a. In a case where the optical sensor 1a is brought closer to the target object 2 and the non-target object 3, the detection range of the optical sensor 1a is limited as compared with before being brought close, and the ratio of space occupied by the mixed object of the non-target object 3 and the target object 2 in the detection range increases. Thus, in a case where the optical sensor 1a and the target object 2 are close to each other, the distortion coefficient is set so as to increase the distortion correction amount when the calculation unit 26 calculates the distance, and thus a solution close to the actual distance is obtained.

In a case where the target object 2 is disposed on the non-target object 3 as an example, the information acquisition unit 30 may acquire the distance between the optical sensor 1*a* and the non-target object 3 as the range-related information, and the calculation unit 26 may set K in Equation (2) described above to K1 when the distance between the optical sensor 1*a* and the non-target object 3 is less than a threshold value, and may set K in Equation (2) described above to K2 (K1>K2) when the distance between the optical sensor 1*a* and the non-target object 3 is equal to the threshold value or more. In other words, the calculation unit 26 can set the distortion coefficient such that the distortion coefficient increases as the range in which the target object 2 may be present becomes closer to the optical sensor 1*a*. As the range in which the target object 2 may be present becomes closer to the optical sensor 1*a*, the calculation unit 26 may change the distortion coefficient stepwise in two steps or more, or may gradually increase the distortion coefficient. The value of the distortion coefficient set by the calculation unit 26 may be, for example, experimentally determined.

Fifth Embodiment

A fifth embodiment of the present disclosure will be described below. Note that, for convenience of explanation, components having functions identical to those in the first to fourth embodiments will be denoted by the same reference numerals, and descriptions of those components will be omitted.

In the present embodiment, the optical sensor 1 includes, as the signal light receiving unit 21, a plurality of light-receiving elements having different detection angles from each other. Accordingly, the plurality of light-receiving elements detect signal light from the target object 2 and the non-target object 3 at different detection angles from each other.

According to the configuration described above, by detecting the signal light from the target object 2 and the non-target object 3 at different detection angles, the distance between the optical sensor 1 and the target object 2 can be calculated with high accuracy. Furthermore, the light-emitting elements 13 or the signal light receiving units 21 have different incident angles or different detection angles from each other, and thus the accuracy of the detection distance can be selectively increased.

An example of edge detection of the target object 2 using the present embodiment is given. In a case where the positional relationship of the target object 2 is not fixed and the position of the target object 2 with respect to the optical sensor 1 is not constrained, because the optical sensor 1 includes the signal light receiving units 21 having different detection angles from each other, the distance can be calculated by utilizing the signals of the light-receiving elements appropriately capturing the target object 2. As a result, resistance to positional variation of the target object 2 can be improved. In other words, since the optical sensor 1 includes the plurality of light-receiving elements having different detection angles from each other, even when the position of the target object 2 varies, any light-receiving element receives the light at an appropriate angle and the signals of the light-receiving elements are used, and thus the high accuracy of the distance calculation can be maintained. The configuration of the present embodiment is extremely effective since the range of the target object 2 in which the distance can be calculated with high accuracy is wider than that of a configuration including a single-angle light-receiving element.

Sixth Embodiment

A sixth embodiment of the present disclosure will be described below. Note that, for convenience of explanation, components having functions identical to those in the first to fifth embodiments will be denoted by the same reference numerals, and descriptions of those components will be omitted.

The present embodiment is applied to, for example, an electronic device including an optical sensor 1*b*. The electronic device includes, for example, a water purifier or a surveying instrument that performs a specific operation in a case where the target object is within a predetermined distance, but is not limited to these electronic devices.

Figure 9:
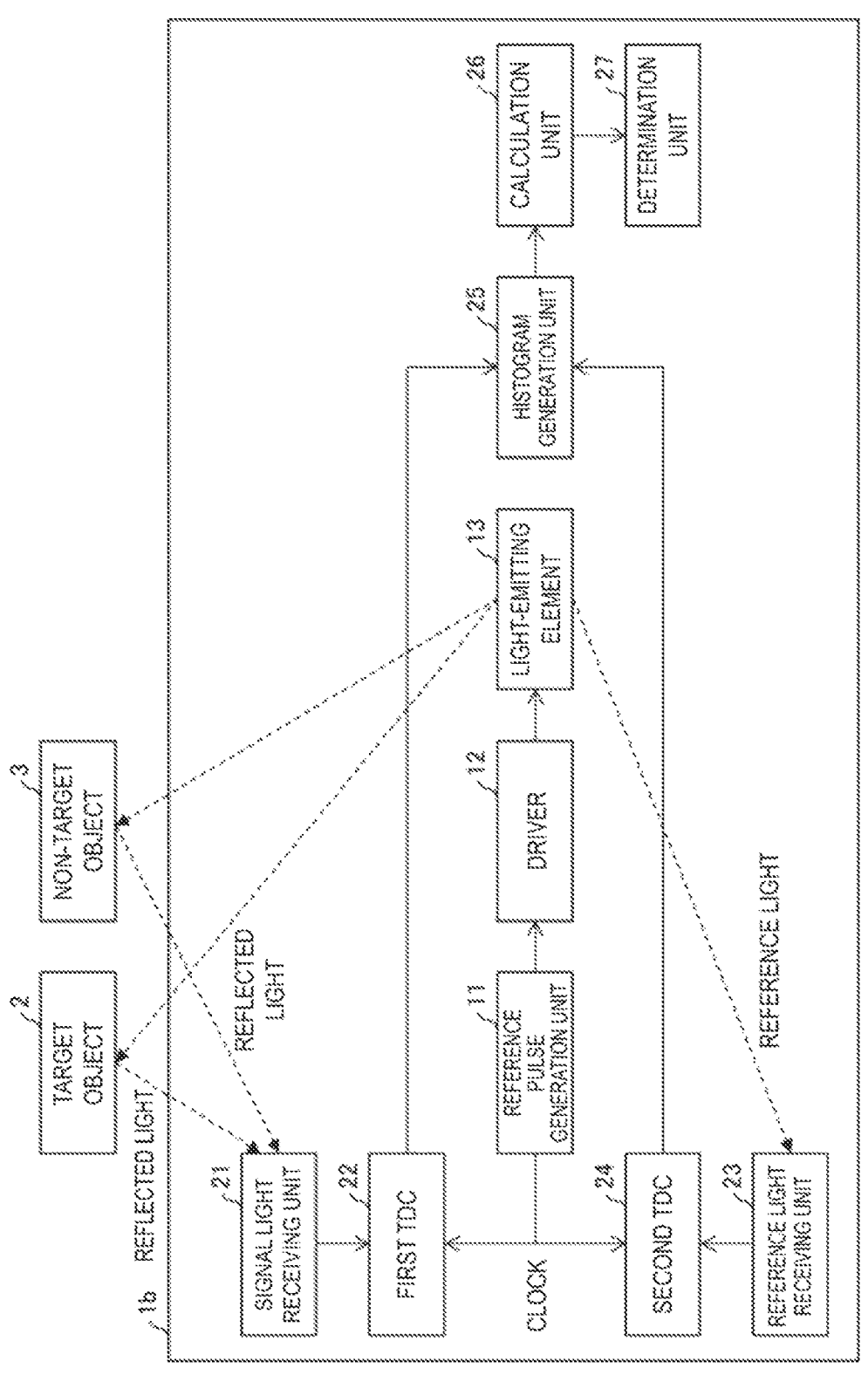
FIG. 9 is a block diagram illustrating a configuration of an optical sensor according to a sixth embodiment of the present disclosure.

FIG. 9 is a block diagram illustrating a configuration of the optical sensor 1*b* according to the present embodiment. As can be seen by comparing FIG. 1 and FIG. 9, the optical sensor 1*b* further includes a determination unit 27 compared to the optical sensor 1. The determination unit 27 determines whether the target object 2 is detected by comparing a distance between the optical sensor 1*b* and the target object 2 calculated by the calculation unit (second calculation unit) 26 with a threshold value of the distance. Specifically, the determination unit 27 determines that the target object 2 is detected in a case where the distance between the optical sensor 1*b* and the target object 2 is equal to the threshold value or less.

Figure 10:
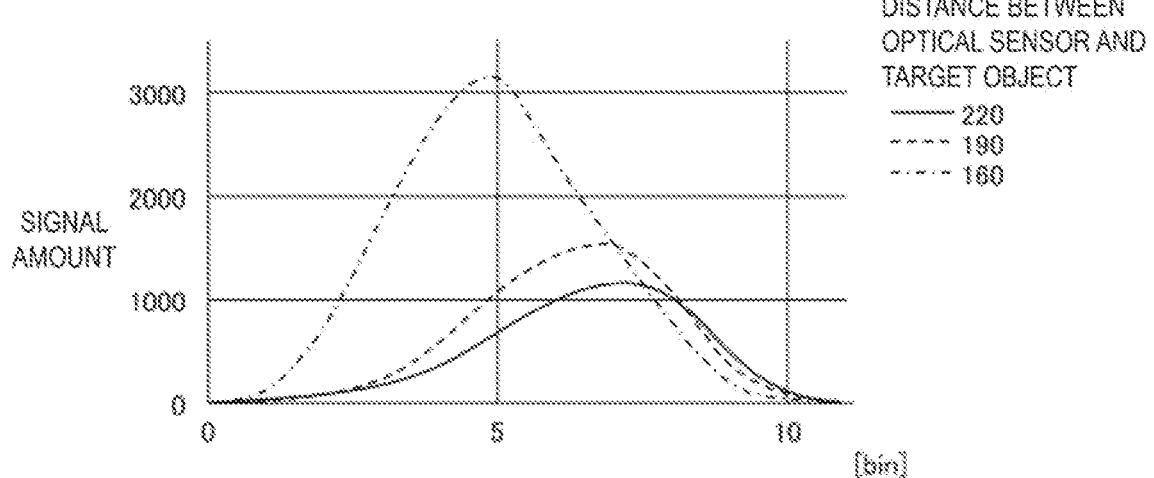
FIG. 10 is a graph showing a change in a signal amount detected by the optical sensor due to a difference in distance according to the sixth embodiment of the present disclosure.

FIG. 10 is a graph showing a change in a signal amount detected by the optical sensor 1*b* due to a difference in the distance between the optical sensor 1*b* according to the present embodiment and the target object 2. As illustrated in FIG. 10, as the optical sensor 1*b* and the target object 2 become closer to each other, the signal amount increases. On the other hand, as the optical sensor 1*b* and the target object 2 separate from each other, the signal amount decreases. When the signal amount decreases, the difference between the signal light and the surrounding noise light decreases, and thus noise light cannot be ignored. The signal amount detected by the optical sensor 1*b* may vary depending on magnitudes of reflectivity of the target object 2 and the non-target object 3.

Because of this characteristic, the calculation unit (first calculation unit) 26 may adjust the threshold value of the distance in accordance with the intensity of the reflected light from the target object 2. For example, in a case where a detection signal amount is large (reflected light is strong), the SN ratio is good and so the calculation unit 26 sets a threshold value that is close to an ideal distance for performing a predetermined operation. On the other hand, in a case where the detection signal amount is small (reflected light is weak), there is a possibility that the distance is calculated to be longer by the amount of distance to a light source of the noise light due to the influence of the noise light, and thus the calculation unit 26 sets the threshold value to be larger than the above-described ideal distance. As a result, resistance to noise light can be improved.

Processing of Optical Sensor 1*b*

FIG. 11 is a flowchart illustrating processing of the optical sensor 1*b* according to the present embodiment. The processing of the optical sensor 1*b* will be described in accordance with FIG. 11.

Step S61

Before the target object 2 moves, in the optical sensor 1*b*, the histogram generation unit 25 generates a histogram based on a signal from the signal light receiving unit 21 configured to receive signal light outside the optical sensor 1*b*. Furthermore, the histogram generation unit 25 generates the histogram based on a signal from the reference light receiving unit 23 configured to receive reference light inside the optical sensor 1b. Then, the calculation unit 26 subtracts the position of the center of gravity of the histogram based on the reference light from the position of the center of gravity of the generated histogram based on the signal light. Thus, an origin position can be set in a histogram 1 before moving.

Step S62

After the target object 2 moves, in the optical sensor 1b, the histogram generation unit 25 generates a histogram based on a signal from the signal light receiving unit 21 configured to receive the signal light outside the optical sensor 1b. Furthermore, the histogram generation unit 25 generates a histogram based on a signal from the reference light receiving unit 23 configured to receive reference light inside the optical sensor 1b. Then, the calculation unit 26 subtracts the position of the center of gravity of the histogram based on the reference light from the position of the center of gravity of the generated histogram based on the signal light. Thus, an origin position can be set in a histogram 2 after moving.

Step S63

The calculation unit 26 adjusts a threshold value serving as a distance value for detection determination in accordance with the signal amounts of the histogram 1 obtained in step S61 and the histogram 2 of the result obtained in step S62. Note that the calculation unit 26 may adjust the threshold value in accordance with not only the signal amount but also a height (or movement amount) of the optical sensor 1b. In this case, the optical sensor 1b further includes the information acquisition unit 30. Then, the calculation unit 26 acquires the height of the optical sensor 1b (or the movement amount of the optical sensor 1b) from the information acquisition unit 30. Then, the calculation unit 26 adjusts the threshold value to be larger as the position of the optical sensor 1b separates from the assumed light source of the noise light (for example, the floor surface serving as the light source of the reflected light).

Step S64

The calculation unit 26 calculates each skewness from the histogram 1 obtained in step S61 and the histogram 2 of the result obtained in step S62 by using Equation (1) of the first embodiment.

Step S65

The calculation unit 26 subtracts the histogram 1 obtained in step S61 from the histogram 2 obtained in step S62, and generates the histogram 3 for signal extraction.

Step S66

The calculation unit 26 corrects the distortion of the histogram 3 for signal extraction generated in step S65 by using the skewness calculated in step S64 and the predetermined distortion coefficient, and calculates the distance value between the optical sensor 1b and the target object 2 from the histogram 3.

Step S67

The determination unit 27 determines detection or non-detection of the target object 2 by comparing the distance value calculated in step S66 with the threshold value adjusted in step S63.

Specifically, the determination unit 27 determines whether the distance value calculated in step S66 is equal to or less than the threshold value adjusted in step S63. In a case where the distance value is equal to or less than the threshold value, the determination unit 27 determines that the target object 2 is detected. In a case where the distance value is greater than the threshold value, the determination unit 27 determines that the target object 2 is not detected. Note that, even when the distance value is equal to or less than the threshold value, the determination unit 27 may invalidate the detection of the target object 2 in a case where the signal amount of the histogram 2 is less than the signal amount of the histogram 1 despite the signal supposedly being large by the distance square law of light when the distance to the target object 2 is small.

Example 3

In order to more specifically illustrate the effect of the present embodiment, a case will be described in which tip detection of target objects 2 made of different materials from each other is performed in an environment in which the target object 2 and the non-target object 3 are mixed.

Figure 12:
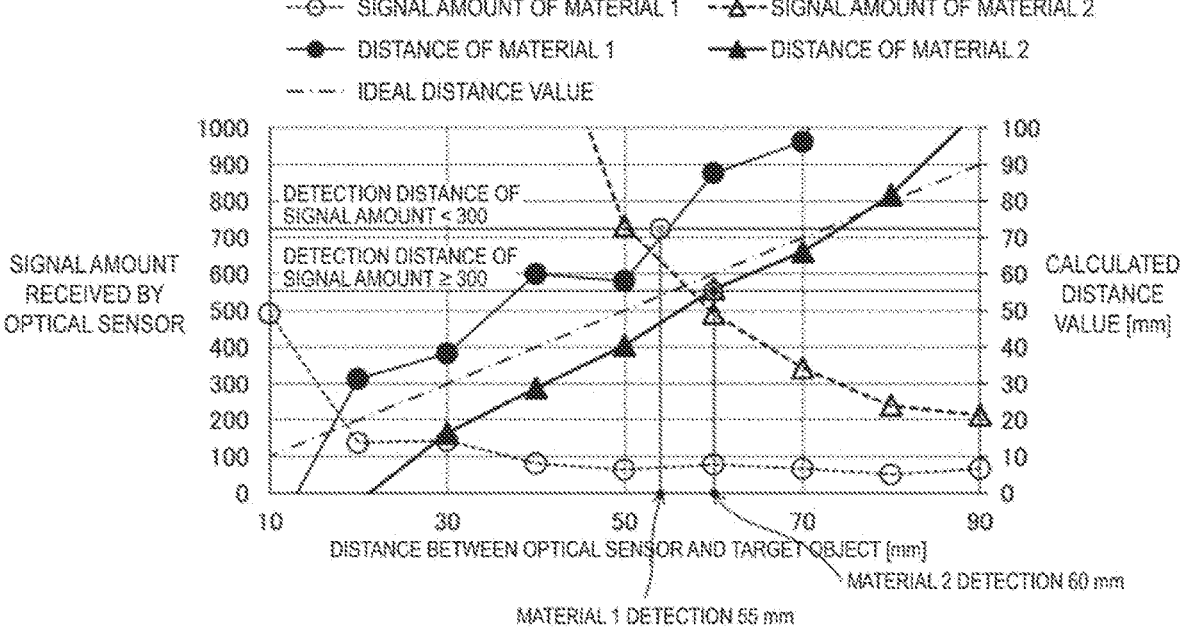
FIG. 12 is a graph showing a specific example of the sixth embodiment of the present disclosure.

FIG. 12 is a graph showing changes in signal amounts and changes in calculated distance values when the optical sensor 1b is moving relative to target objects 2 made of different materials. In FIG. 12, the distance represented by the dashed-dotted line is ideally calculated. A material 2 is a material having higher reflectivity than a material 1. Note that the reflectivity of the target object 2 changes even depending on the color and shape in addition to the material of the target object 2.

In a case where the optical sensor 1b and the target object 2 are close to each other, the influence of the noise is small, and thus the optical sensor 1b can easily calculate a more accurate distance value of the target object 2. As indicated by the broken line in FIG. 12, the closer the optical sensor 1b and the target object 2 are to each other (the smaller the distance on the horizontal axis), the more the signal amount increases in a shape close to the square, and thus it can be seen that there is less influence of noise or the like and that the reflected light is captured from the target object 2.

On the other hand, in a case where the optical sensor 1b and the target object 2 are separated from each other, or in a case where the materials of the target objects 2 are different from each other, the influence of noise is large, and thus the optical sensor 1b likely to calculate a distance value greatly influenced by the non-target object 3. As indicated by the line with white circle plot marks in FIG. 12, since rise of the signal amount does not occur until the distance becomes short for the material 1 having a low reflectivity as compared with the material 2 having a high reflectivity, it can be seen that the influence of noise is large. As indicated by the line with white triangle plot marks in FIG. 12, since the change in the signal amount at a position having a long distance is not the shape of the square even in the case of the material 2 having the high reflectivity, it can be seen that the influence of noise is large.

Thus, by adjusting the threshold value of the detection distance in accordance with the signal amount received by the optical sensor 1b, the optical sensor 1b functions to switch between the detection distance between the case where the target object 2 is more appropriately detected and the case where the target object 2 is not detected, and the object can be detected at an appropriate position which is resistant to the noise and is less likely to be influenced by the difference in materials.

As shown in FIG. 12, the change in the calculated distance for the material 1 having low reflectivity (solid line with circles in the graph) is not a linear transition as compared with the change in the calculated distance for the material 2 having high reflectivity (solid line with triangles in the graph). Even when actual distances are the same, different calculated distances between the material 1 and the material 2 are indicated.

Thus, since the magnitude of the signal amount varies in accordance with the target object 2, the calculation unit 26 may switch the threshold value in accordance with the magnitude of the signal amount. In one aspect, in a case where the signal amount is equal to or greater than a predetermined amount, the calculation unit 26 may use a shorter threshold value as the threshold value for the calculated distance value than when the signal amount is less than the predetermined amount.

For example, in the example shown in FIG. 12, in a case where the calculation unit 26 (*i*) sets the threshold value for the calculated distance value to 72 mm when the signal amount is less than 300 and (ii) sets the threshold value for the calculated distance value to 55 mm when the signal amount is 300 or greater, the determination unit 27 (*i*) determines that the calculated distance exceeds the threshold value when the target object 2 of the material 1 having low reflectivity is actually located at a distance of 55 mm and (ii) determines that the calculated distance exceeds the threshold value when the target object 2 of the material 2 having high reflectivity is actually located at a distance of 60 mm. As a result, the difference between the actual distances when the determination unit 27 determines that the calculated distance exceeds the threshold value can be reduced as compared with a case where a constant threshold value is used. Thus, with respect to the target objects 2 having different materials from each other, the optical sensor 1*b* can determine that the calculated distance has exceeded the threshold value at a close distance even when the materials are different.
Implementation Example by Software Functions of the optical sensor 1, 1*a*, and 1*b* (hereinafter referred to as "optical sensor") can be implemented by a program for causing a computer to function as the optical sensor and for causing the computer to function as each control block (specifically, the histogram generation unit 25, the calculation unit 26, and the determination unit 27) of the optical sensor.

In this case, the optical sensor includes a computer including at least one control device (for example, a processor) and at least one storage device (for example, a memory) as hardware for executing the program. By executing the program with the control device and the storage device, each function described in the above-described each embodiment is achieved.

The program may be stored in one or a plurality of computer-readable non-transitory storage medium. The storage medium may or may not be included in the device described above. In the latter case, the program may be supplied to the device via any transmission medium, wired or wireless.

Furthermore, some or all of the functions of each control block can be implemented by a logic circuit. For example, an integrated circuit in which the logic circuit functioning as each control block described above is formed is also included within the scope of the present disclosure. In addition to this, it is also possible to realize the function of each control block described above by, for example, a quantum computer.
Supplement An optical sensor according to a first aspect of the present disclosure is an optical sensor including a light-emitting element configured to emit light in a region where an object is present, a light-receiving element configured to receive reflected light from the object, a generation unit configured to generate a histogram indicating a relationship between a time from emission of the light by the light-emitting element to reception of the reflected light by the light-receiving element and an intensity of the reflected light received by the light-receiving element, a first calculation unit configured to calculate skewness of the histogram, and a second calculation unit configured to calculate a distance between the optical sensor and the object with reference to the histogram and the skewness.

According to the configuration described above, since the histogram and the skewness are referred to, the distance to the object can be calculated with high accuracy even when a plurality of the objects are present.

In the optical sensor according to a second aspect of the present disclosure, in the first aspect, the second calculation unit may calculate the distance by using a center of gravity of the histogram and a value obtained by multiplying the skewness by a distortion coefficient.

According to the configuration described above, since the center of gravity of the histogram and the value obtained by multiplying the skewness by the distortion coefficient are used, the distance to the object can be calculated with further high accuracy.

In the optical sensor according to a third aspect of the present disclosure, in the first or second aspect, the histogram may include a first histogram corresponding to the object before moving and a second histogram corresponding to the object after moving, the generation unit may generate each of the first histogram and the second histogram, and the second calculation unit may calculate the distance with reference to a difference between the first histogram and the second histogram.

According to the configuration described above, by referring to the difference between the histograms before and after movement when the optical sensor moves, it is possible to leave a large amount of a component of the object close to the optical sensor and substantially cancel a component of the object separated from the optical sensor, among the reflected light component of the object, and thus, the distance to the object to be measured close to the optical sensor can be calculated with high accuracy.

The optical sensor according to a fourth aspect of the present disclosure, in any one of the first to third aspects, may include an acquisition unit configured to acquire information related to a range having possibility that the object is present, wherein the first calculation unit may calculate the skewness with reference to the information related to the range having the object is present.

According to the configuration described above, since the skewness is calculated with reference to the range in which the object may be present, the skewness is appropriately determined, and thus the accuracy of the distance corrected using the skewness is improved.

The optical sensor according to a fifth aspect of the present disclosure, in the second aspect, may include an acquisition unit configured to acquire information related to a range having possibility that the object is present, wherein the second calculation unit may use the distortion coefficient corresponding to the information related to the range having possibility that the object is present.

According to the configuration described above, since the distance is calculated using the distortion coefficient corresponding to the range in which the object may be present, the accuracy of the distance is improved.

The optical sensor according to a sixth aspect of the present disclosure, in any one of the first to third aspects, may include a plurality of the light-receiving elements having different detection angles from each other.

According to the configuration described above, since the plurality of light-receiving elements have different detection angles from each other, the accuracy of the detection distance can be selectively increased.

The optical sensor according to a seventh aspect of the present disclosure, in any one of the first to third aspects, may include a determination unit configured to determine whether the object is detected by comparing the distance calculated by the second calculation unit and a threshold value of the distance.

According to the configuration described above, it is possible to determine that the target object has been detected when the distance is equal to the threshold value or less.

In the optical sensor according to an eight aspect of the present disclosure, in the seventh aspect, the first calculation unit may adjust the threshold value in accordance with the intensity of the reflected light.

According to the configuration described above, since the threshold value of the distance is adjusted in accordance with the intensity of the reflected light, resistance to noise light can be improved.

An electronic device according to a ninth aspect of the present disclosure includes the optical sensor according to any one of the first to eighth aspects.

According to the configuration described above, since the histogram and the skewness are referred to, the distance to the object can be calculated with high accuracy even when a plurality of the objects are present.

A distance calculation method according to a tenth aspect of the disclosure is a distance calculation method for an optical sensor including a light-emitting element configured to emit light in a region where an object is present and a light-receiving element configured to receive reflected light from the object, the distance calculation method including generating a histogram indicating a relationship between a time from emission of the light by the light-emitting element to reception of the reflected light by the light-receiving element and an intensity of the reflected light received by the light-receiving element, performing a first calculation of calculating skewness of the histogram, and performing a second calculation of calculating a distance between the optical sensor and the object with reference to the histogram and the skewness.

According to the configuration described above, since the histogram and the skewness are referred to, the distance to the object can be calculated with high accuracy even when a plurality of the objects are present.

The optical sensor according to each of the aspects of the present disclosure may be implemented by a computer. In this case, a control program of the optical sensor that implements the optical sensor described above by a computer by causing the computer to function as each unit (software element) provided in the optical sensor, and a computer-readable storage medium that stores the control program also fall within the scope of the present disclosure.

An aspect of the disclosure is not limited to each of the above-described embodiments. It is possible to make various modifications within the scope of the claims. An embodiment obtained by appropriately combining technical elements each disclosed in different embodiments falls also within the technical scope of the aspect of the disclosure. Furthermore, technical elements disclosed in the respective embodiments may be combined to provide a new technical feature.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical sensor comprising:
   a light-emitting element configured to emit light in a region where an object is present;
   a light-receiving element configured to receive reflected light from the object;
   a generation unit configured to generate a histogram indicating a relationship between a time from emission of the light by the light-emitting element to reception of the reflected light by the light-receiving element and an intensity of the reflected light received by the light-receiving element;
   a first calculation unit configured to calculate skewness of the histogram; and
   a second calculation unit configured to calculate a distance between the optical sensor and the object with reference to the histogram and the skewness,
   wherein the second calculation unit calculates the distance by using a center of gravity of the histogram and a value obtained by multiplying the skewness by a distortion coefficient.

2. The optical sensor according to claim 1,
   wherein the histogram includes a first histogram corresponding to the object before moving and a second histogram corresponding to the object after moving,
   the generation unit generates each of the first histogram and the second histogram, and
   the second calculation unit calculates the distance with reference to a difference between the first histogram and the second histogram.

3. The optical sensor according to claim 1, further comprising:
   an acquisition unit configured to acquire information related to a range having possibility that the object is present,
   wherein the first calculation unit calculates the skewness with reference to the information related to the range having possibility that the object is present.

4. The optical sensor according to claim 1, further comprising:
   an acquisition unit configured to acquire information related to a range having possibility that the object is present,
   wherein the second calculation unit uses the distortion coefficient corresponding to the information related to the range having possibility that the object is present.

5. The optical sensor according to claim 1, further comprising:
   a plurality of the light-receiving elements having different detection angles from each other.

6. The optical sensor according to claim 1, further comprising:
   a determination unit configured to determine whether the object is detected by comparing the distance calculated by the second calculation unit and a threshold value of the distance.

7. The optical sensor according to claim 6,
   wherein the first calculation unit adjusts the threshold value in accordance with the intensity of the reflected light.

8. An electronic device comprising:
the optical sensor according to claim 1.

* * * * *